(12) United States Patent
Obu et al.

(10) Patent No.: US 9,266,309 B2
(45) Date of Patent: Feb. 23, 2016

(54) METHOD OF PRODUCING GAS-BARRIER LAMINATED MEMBER

(75) Inventors: Yusuke Obu, Kanagawa (JP); Kashiko Kawai, Kanagawa (JP); Tomohiro Miyai, Kanagawa (JP); Takahiro Hidaka, Kanagawa (JP); Hideki Masuda, Kanagawa (JP)

(73) Assignees: TOYO SEIKAN KAISHA, LTD., Tokyo (JP); KANSAI PAINT CO., LTD., Hyogo (JP)

( * ) Notice: Subject to any disclaimer, the term of this patent is extended or adjusted under 35 U.S.C. 154(b) by 59 days.

(21) Appl. No.: 12/990,122

(22) PCT Filed: Jun. 26, 2009

(86) PCT No.: PCT/JP2009/061774
§ 371 (c)(1),
(2), (4) Date: Oct. 28, 2010

(87) PCT Pub. No.: WO2010/001836
PCT Pub. Date: Jan. 7, 2010

(65) Prior Publication Data
US 2011/0091743 A1 Apr. 21, 2011

(30) Foreign Application Priority Data
Jun. 30, 2008 (JP) .................................. 2008-171452

(51) Int. Cl.
| | |
|---|---|
| *B32B 27/30* | (2006.01) |
| *B05D 5/00* | (2006.01) |
| *B05D 7/22* | (2006.01) |
| *C08J 7/04* | (2006.01) |
| *B32B 27/36* | (2006.01) |
| *B05D 3/02* | (2006.01) |
| *B05D 3/10* | (2006.01) |

(52) U.S. Cl.
CPC . *B32B 27/36* (2013.01); *B05D 3/02* (2013.01); *B05D 3/10* (2013.01); *C08J 7/042* (2013.01); *C08J 7/045* (2013.01); *B32B 2250/02* (2013.01); *B32B 2250/24* (2013.01); *C08J 2367/02* (2013.01)

(58) Field of Classification Search
CPC .................................. B05D 3/10; B05D 3/107
USPC ................. 427/331, 337, 407.1, 419.1, 419.8
See application file for complete search history.

(56) References Cited

U.S. PATENT DOCUMENTS

| | | | |
|---|---|---|---|
| 7,476,712 B2 | 1/2009 | Tanaka et al. | |
| 2005/0131162 A1* | 6/2005 | Tanaka et al. | ............... 525/329.7 |
| 2010/0015449 A1 | 1/2010 | Obu et al. | |
| 2012/0219806 A1* | 8/2012 | Miyai et al. | ................ 428/424.4 |

FOREIGN PATENT DOCUMENTS

| | | |
|---|---|---|
| EP | 1614532 | 1/2006 |
| JP | 2002-240207 | 8/2002 |
| JP | 2003-171419 | 6/2003 |
| JP | 2005-272757 | 10/2005 |
| JP | 2006-219518 | 8/2006 |
| JP | 2007-056084 | 3/2007 |
| JP | 2007-131816 | 5/2007 |
| JP | 2007-160302 | 6/2007 |
| JP | 2007-160929 | 6/2007 |
| JP | 2007-313758 | 12/2007 |
| WO | 03/091317 | 11/2003 |

OTHER PUBLICATIONS

Search report from E.P.O. that issued with respect to patent family member European Patent Application No. 09773414 9, mail date is Nov. 28, 2011.
U.S. Appl. No. 12/674,786 to Yusuke Obu et al., filed Feb. 23, 2010.

* cited by examiner

*Primary Examiner* — William Phillip Fletcher, III
(74) *Attorney, Agent, or Firm* — Greenblum & Bernstein, P.L.C.

(57) ABSTRACT

A method of producing a gas-barrier laminated member having a gas-barrier layer formed by crosslinking the carboxyl groups of a polycarboxylic acid polymer with multivalent metal ions. The method comprises forming a layer (A) containing an alkaline compound of a multivalent metal on at least one surface of a plastic base material, applying a solution (b) obtained by dissolving a polycarboxylic acid polymer in a solvent containing at least water onto the layer (A) that contains the alkaline compound of the multivalent metal, and removing the solvent by a heat treatment so that a metal-ionically crosslinked structure is formed with the multivalent metal ions among the carboxyl groups in the solution (b). The gas-barrier laminated member has excellent adhesion to the base material, gas-barrier property, retort resistance and flexibility, and is efficiently produced by only being heated at a low temperature for a short period of time through a decreased number of simplified steps.

9 Claims, 1 Drawing Sheet

METHOD OF PRODUCING GAS-BARRIER LAMINATED MEMBER

TECHNICAL FIELD

This invention relates to a method of producing a gas-barrier laminated member having a gas-barrier layer formed by crosslinking the carboxyl groups of a polycarboxylic acid polymer with metal ions. More specifically, the invention relates to a method of producing a gas-barrier laminated member through simplified production steps featuring excellent productivity and economy.

BACKGROUND ART

A variety of gas-barrier members have heretofore been proposed and, particularly, a polyvinylidene chloride, a polyacrylonitrile and an ethylene/vinyl alcohol copolymer have been known as gas-barrier resins. From the environmental problems, however, it is a tendency to refrain from using the polyvinylidene chloride and the polyacrylonitrile. The ethylene/vinyl alcohol copolymer, on the other hand, permits the gas-barrier property to vary much depending upon the humidity; i.e., the gas-barrier property decreases under highly humid conditions.

In order to solve the above problems, there have been proposed a gas-barrier resin composition in which a polycarboxylic acid polymer is reacted with a crosslinking agent having 2 to 4 functional groups that react with the carboxyl groups and with metal ions having a valency of two or more so that the polycarboxylic acid polymer forms crosslinked portions due to the crosslinking agent and, further, forms the crosslinked portions due to the metal ions having the valency or two or more, the weight ratio of the polycarboxylic acid polymer and the crosslinking agent being 99.9/0.1 to 65/35 (patent document 1), and a gas-barrier film having a gas-barrier coating formed on at least one surface of a thermoplastic resin film, the coating being formed from a polyacrylic acid crosslinked with a crosslinking agent which contains an epoxy compound having not less than 3 epoxy groups per a molecule, and the crosslinking agent being contained in an amount of 1 to 100 parts by mass per 100 parts by mass of the polyacrylic acid (patent document 2).

The gas-barrier materials disclosed in the above patent documents 1 and 2 must be crosslinked to a high degree through the heating at a high temperature of not lower than 150° C. or conducted for a long period of time and, therefore, greatly affect the plastic substrate and, besides, require the dipping treatment or the spray treatment for conducting the ionic crosslinking with metal ions, deteriorating productivity and consuming large amounts of energy and water. Besides, these gas-barrier materials fail to satisfy the requirements of flexibility and retort resistance.

There has, further, been proposed a gas-barrier laminated film which enables dry-firing to be effected at a relatively low temperature, the gas-barrier laminated film comprising a layer (a) formed from a coating solution (A) containing a polycarboxylic acid polymer without heat treatment and a layer (b) formed from a coating solution (B) containing a water-soluble multivalent metal salt and an aqueous resin, the layer (a) formed from the coating solution (A) and the layer (b) formed from the coating solution (B) forming at least a pair of lamination units neighboring each other (patent document 3).

Patent document 1: JP-A-2003-171419
Patent document 2: JP-A-2002-240207
Patent document 3: JP-A-2007-313758

OUTLINE OF THE INVENTION

Problems that the Invention is to Solve

The gas-barrier laminated film described in the above patent document 3 can be dry-fired at a relatively low temperature without affecting the base material permitting, however, the polycarboxylic acid polymer applied first to be fixed. Therefore, the multivalent metal salt does not migrate into the layer (a) to a sufficient degree, and the ionic crosslinking is not sufficiently attained with the multivalent metal. After the firing, therefore, the ionic crosslinking must be heightened by effecting the dipping treatment or the spray treatment in a customary manner to obtain a sufficient degree of gas-barrier property. Further, an undercoating must be formed for sufficient adhesion to the base material, and separate steps are required for forming the layers. Thus, the gas-barrier laminated film is not still satisfactory from the standpoint of productivity and cost, either.

It is, therefore, an object of the present invention to provide a method of producing a gas-barrier laminated member having a gas-barrier layer formed by crosslinking the carboxyl groups of a polycarboxylic acid polymer with multivalent metal ions, the gas-barrier laminated member having excellent adhesion to the base material, gas-barrier property, retort resistance and flexibility, and the gas-barrier laminated member being efficiently produced by only being heated at a low temperature for a short period of time through a decreased number of simplified steps.

Means for Solving the Problems

According to the present invention, there is provided a method of producing a gas-barrier laminated member comprising forming a layer (A) containing an alkaline compound of a multivalent metal on at least one surface of a plastic base material, applying a solution (b) obtained by dissolving a polycarboxylic acid polymer in a solvent containing at least water onto the layer (A) that contains the alkaline compound of the multivalent metal, and removing the solvent by a heat treatment so that a metal-ionically crosslinked structure is formed with the multivalent metal ions among the carboxyl groups in the solution (b).

In the method of producing the gas-barrier laminated member of the invention, it is desired that:
1. The layer (A) is formed by applying a coating composition (a) that contains the alkaline compound of the multivalent metal;
2. The coating composition (a) contains an isocyanate compound;
3. An urethane bond is formed in the layer (A);
4. The solution (b) contains a solvent having good affinity to the layer that contains the alkaline compound of the multivalent metal;
5. The polycarboxylic acid polymer is a poly(meth)acrylic acid or a partly neutralized product thereof;
6. The alkaline compound of the multivalent metal comprises at least one of a carbonate or a hydroxide of calcium or magnesium;
7. The primary particle size of the alkaline compound of the multivalent metal is not larger than 0.5 μm; and
8. The solution (b) contains a crosslinking agent capable of forming a crosslinked structure due to covalent bond between carboxyl groups unreacted with a multivalent metal ion, the crosslinked portion is forming at least two ester bonds or amido ester bonds or is forming at least one ester bond neighboring the cycloalkyl group.

The invention, further, provides the gas-barrier laminated member produced by the above production method.

Effects of the Invention

According to the method of producing the gas-barrier laminated member of the present invention, there is no need of effecting the dipping treatment or the spray treatment that was so far required for crosslinking the carboxyl groups of the polycarboxylic acid polymer with multivalent metal ions and, therefore, the number of steps can be decreased.

According to the method of producing the gas-barrier laminated member of the present invention, further, the carboxyl groups of the polycarboxylic acid polymer can be crosslinked with metal ions like when the dipping treatment or the spray treatment is executed. According to the production method of the present invention, therefore, the gas-barrier laminated member easily forms the crosslinked structure through only the heating conducted at a low temperature for a short period of time without adversely affecting the plastic base material, requiring a shortened time for production and a decreased amount of energy making it possible to form an excellent gas-barrier material maintaining good productivity.

Besides, excellent adhesion is obtained to the plastic material which is the base material without the need of separately forming an anchor coating.

Moreover, the gas-barrier laminated member obtained by the production method of the present invention exhibits excellent gas-barrier property, water resistance and flexibility and, further, maintains excellent gas-barrier property even after subjected to high-temperature and wet heated conditions such as of retort sterilization, thus, also featuring retort resistance.

BEST MODE FOR CARRYING OUT THE INVENTION

According to the method of producing a gas-barrier laminated member of the present invention, a coating composition (a) containing an alkaline compound of a multivalent metal is applied onto at least one surface of a plastic base material to form a layer (A) that contains the alkaline compound of the multivalent metal and, thereafter, a solution (b) obtained by dissolving a polycarboxylic acid polymer in a solvent that contains at least water is applied onto the layer (A) to form a precursor layer (B) of a gas-barrier layer, and a heat treatment is conducted for removing the solvent from the precursor layer (B) enabling multivalent metal ions to migrate from the layer (A) into the precursor layer (B) so that a metal-ionically crosslinked structure is formed among the carboxyl groups of the polycarboxylic acid polymer.

According to the production method of the present invention, therefore, the steps of application are simplified, and the metal-ionically crosslinked structure is formed among the carboxyl groups of the polycarboxylic acid polymer at a low temperature for a short period of time obviating the need of conducting the dipping treatment or the spray treatment that was, so far, necessary for forming the ionically crosslinked structure. Therefore, the gas-barrier layer can be formed on the plastic base material without requiring large amounts of energy or water owing to a decreased number of the steps.

(Coating Composition (a))

In the present invention, the coating composition (a) for forming the layer (A) that contains the alkaline compound of the multivalent metal is obtained by dispersing the alkaline compound of the multivalent metal in a coating component.

In the present invention, it is particularly important that the multivalent metal is the alkaline compound. Therefore, during the heat treatment conducted for removing the solvent from the precursor layer (B) formed by using the solution (b), the multivalent metal ions migrate from the layer (A) into the layer (B). Namely, the alkaline compound of the multivalent metal that has migrated from the layer (A) into the layer (B) dissolves quickly to release multivalent metal ions; i.e., the multivalent metal ions diffuse over the whole layer (B). In order for the alkaline compound of the multivalent metal that has migrated into the layer (B) to quickly dissolve, it is desired that the surfaces of particles of the alkaline compound of the multivalent metal have not been chemically treated.

In the present invention, further, particles of the alkaline compound of the multivalent metal may often remain in the layer (A) of the gas-barrier laminated member. If the primary particle size of the particles exceeds 0.5 μm, the transparency of the gas-barrier laminated member may often slightly decrease though it is dependent upon the amount of the particles that remain. It is, therefore, desired that the primary particle size of the alkaline compound of the multivalent metal is not larger than 0.5 μm and, particularly, not larger than 0.4 μm. The primary particle size of particles of the alkaline compound of the multivalent metal can be found by observing a secondary electron image thereof by using a scanning electron microscope.

There is no particular limitation on the multivalent metal ions so far as they are capable of crosslinking the carboxyl groups of the polyacrylic acid. For example, there can be used metal ions such as of alkaline earth metals (magnesium Mg, calcium Ca, strontium Sr, barium Ba, etc.), metals of the Group 8 of periodic table (iron Fe, ruthenium Ru, etc.), metals of the group 11 of periodic table (copper Cu, etc.), metals of the Group 12 of periodic table (zinc Zn, etc.) and metals of the Group 13 of periodic table (aluminum Al, etc.) having a valency of 2 to 3. Preferably, there can be used divalent metal ions such as of calcium, magnesium or zinc. Further, the above metal ions can be used in one or two or more kinds in combination.

As the alkaline compound of the multivalent metal, there can be exemplified hydroxides (magnesium hydroxide, calcium hydroxide, etc.), carbonates (magnesium carbonate, calcium carbonate, etc.), and organic acid salts such as carboxylates (acetates such as zinc acetate, calcium acetate, or lactates such as zinc lactate, calcium lactate) of the above metals. From the standpoint of safety of when used as a food packing material or that no by-product stays in the layer (B) at the time of forming metal-ionic crosslinking, it is, particularly, desired to use at least one kind of a carbonate or a hydroxide of calcium or magnesium.

The coating material that contains the alkaline compound of the multivalent metal can be formed from various polymers such as those of the urethane type, epoxy type, acrylic type or polyester type.

In the present invention, in order to obtain excellent adhesion to the base material and to enhance dispersion of the alkaline compound of the multivalent metal, in particular, it is desired that the coating material contains an isocyanate compound. The coating component may comprise a main agent and a curing agent, and the isocyanate compound can be used as the curing agent. Or, the coating material may be a precursor in a state of which the curing reaction has not been completed or may be in a state where the curing agent is present in an excess amount.

In the present invention, further, to obtain excellent adhesion to the base material and to enhance dispersion of the alkaline compound of the multivalent metal, it is particularly desired that an urethane bond is formed in the layer (A). The coating material may contain the urethane-type polymer in advance. However, there may be used a polyester polyol or a polyether polyol, or polyol components such as these urethane-modified products as a main agent for the isocyanate compound. It is desired that the number of the isocyanate groups in the isocyanate compound is in excess of the number of the hydroxyl groups in the polyol component.

As the polyol component used for forming the urethane-type polymer, it is desired to use a polyester polyol or an urethane-modified product thereof. As the polyester polyol components, there can be exemplified polyester polyols obtained by reacting a multivalent carboxylic acid or a dialkyl ester thereof or a mixture thereof with glycols or a mixture thereof.

As the multivalent carboxylic acid, there can be exemplified aromatic multivalent carboxylic acids such as isophthalic acid, terephthalic acid and naphthalenedicarboxylic acid; and aliphatic multivalent carboxylic acids such as adipic acid, azelaic acid, sebacic acid and cyclohexanedicarboxylic acid.

As the glycol, there can be exemplified ethylene glycol, propylene glycol, diethylene glycol, butylene glycol, neopentyl glycol and 1,6-hexane diol.

The glass transition temperature of the polyester polyol is, preferably, −50° C. to 100° C. and, more preferably, −20° C. to 80° C. Further, the number average molecular weight of the polyester polyol is, preferably, 1000 to 100,000 and, more preferably, 3000 to 80,000.

As the isocyanate compound contained in the coating material or as the isocyanate compound that can be used as a curing agent for forming an urethane-type polymer or as a curing agent that is capable of using in an reaction in combination with other main agent, there can be exemplified aromatic polyisocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate and tetramethylxylylene diisocyanate; aliphatic polyisocyanates such as tetramethylene diisocyanate, 1,6-hexamethylene diisocyanate, dodecamethylene diisocyanate, trimethylhexamethylene diisocyanate, 1,3-cyclohexylene diisocyanate, 4-cyclohexylene diisocyanate, hydrogenated xylylene diisocyanate, lidine diisocyanate, isophorone diisocyanate, 4,4'-dicyclohexylmethane diisocyanate, and 3,3'-dimethyl-4,4'-dicyclohexylmethane diisocyanate; polyfunctional polyisocyanate compounds such as isocyanurate derived from the above polyisocyanate monomer, biuret and allophanate; and polyfunctional polyisocyanate compounds containing a terminal isocyanate group obtained by the reaction with trifunctional or more highly functional polyol compound such as trimethylolpropane or glycerin.

In the coating composition (a) used in the invention, it is desired that the alkaline compound of the multivalent metal is contained in an amount of not less than 0.4 equivalents with respect to the polycarboxylic acid polymer present in the solution (b) that will be described later calculated as metal atoms presuming that two carboxyl groups react with one multivalent metal ion, and is contained in an amount of not less than 0.6 equivalents when used, particularly, for the retort sterilization from the standpoint of maintaining gas-barrier property after the retort sterilization. If the content of the alkaline compound of the multivalent metal is smaller than the above range, the polycarboxylic acid polymer cannot be crosslinked to a sufficient degree and it becomes difficult to maintain gas-barrier property.

It is, further, desired that the content of the resin component in the coating composition (a) is adjusted to be 15 to 80% by weight and, particularly, 20 to 60% by weight.

The resin component in the coating composition (a) can be prepared by using a solvent such as toluene, 2-butanone, cyclohexanone, Solvesso, isophorone, xylene, ethyl acetate or butyl acetate and, particularly, by using a low-boiling solvent for forming the layer at a low temperature. These solvents may be dissolved in a single solution or in a mixed solution, or can be prepared by mixing the solutions of various components together.

In addition to the above components, there can be, further, used a widely known cure accelerating catalyst, filler, softening agent, anti-aging agent, stabilizer, adhesion accelerator, leveling agent, defoaming agent, plasticizer, inorganic filler, stickiness-imparting resin, fibers, coloring agent such as pigment, usable time-extending agent, etc.

(Solution (b))

In the invention, the solution (b) applied onto the layer (A) formed from the coating composition (a) is a solution obtained by dissolving a polycarboxylic acid polymer in a solving containing at least water and in which the polycarboxylic acid polymer is dissociated.

As the polycarboxylic acid polymer contained in the solution (b), there can be exemplified homopolymers or copolymers of monomers having a carboxyl group, such as polyacrylic acid, polymethacrylic acid, polymaleic acid, polyitaconic acid and acrylic acid/methacrylic acid copolymer and, particularly preferably, polyacrylic acid and polymethacrylic acid. Further, a partly neutralized product thereof may be used to accelerate the dissociation of the polycarboxylic acid polymer in the solution.

The polycarboxylic acid polymer can be partly neutralized with a metal hydroxide such as sodium hydroxide or potassium hydroxide, or with ammonia.

Though there is no particular limitation, it is desired that the degree of neutralization of the partly neutralized product is not larger than 60% and, particularly, not larger than 40% in terms of a molar ratio to the carboxyl groups. If the above range is exceeded, the ionic crosslinking with the alkaline compound of the multivalent metal is not attained to a sufficient degree.

Though there is no particular limitation, it is desired that the polycarboxylic acid polymer has "a weight average molecular weight" in a range of 2000 to 5,000,000 and, particularly, 10,000 to 1,000,000.

By using two separation columns, i.e., "TSK G4000PWXL" and "TSK G3000PWXL" (manufactured by Tosoh Co.) and an aqueous solution containing 50 mmols of phosphoric acid as an eluent, the "weight average molecular weight" was found from a chromatogram and a calibration curve of a standard polycarboxylic acid polymer at 40° C. and a flow rate of 1.0 ml/min.

The solvent used for the solution (b) may be water alone, but may be a mixed solvent of water mixed with an alcohol such as methanol, ethanol or isopropanol, ketone such as 2-butanone or acetone, or aromatic solvent such as toluene. In particular, a solvent having a boiling point lower than that of water can be used in combination with water.

It is desired to use a solvent having good affinity to the layer (A) that contains the alkaline compound of the multivalent metal from the standpoint of improving affinity to the layer (A) and accelerating the migration of the alkaline compound of the multivalent metal into the precursor layer (B). Though dependent upon the resin component used for the coating composition (a), when the urethane polymer is used, the solvent having good affinity to the layer (A) is, preferably, an alcohol such as methanol, ethanol or isopropanol, or a ketone such as 2-butanone or acetone.

When a mixed solvent of water and other solvent is used as the solvent, it is desired that the other solvent is blended in an amount of not larger than 1900 parts by weight and, particularly, in an amount of 10 to 900 parts by weight per 100 parts by weight of water.

The solution (b) may be blended with a crosslinking agent that reacts with the unreacted carboxyl group of the polycarboxylic acid polymer to form the crosslinked structure based on the covalent bond. That is, the multivalent metal ions migrated from the layer (A) form the crosslinked structure upon undergoing ionic crosslinking with the carboxyl groups of the polycarboxylic acid polymer. Here, the carboxyl groups that were not used for the crosslinking may now be crosslinked with a crosslinking agent to form a crosslinked structure due to the covalent bond in the crosslinked portion to thereby improve the resistance of the formed gas-barrier layer against the heat and water.

Particularly preferred examples of the crosslinking agent include a compound having two ring structures which include oxygen in an ether bond that is formed with carbon which forms a double bond with nitrogen, i.e., having two ring structures that have a group —N=C—O— or an oxoimino group having a part =C—O— in the ring, and an alicyclic epoxy compound containing an epoxy compound component that has an alicyclic group in the molecules and in which neighboring carbon atoms of the alicyclic group are forming an oxylane ring. By using these crosslinking agents, it is allowed to form at least two ester bonds or amido ester bonds in the crosslinked portion or to form at least one ester bond neighboring the cycloalkyl group.

These crosslinking agents can be used alone or in combination.

Though not limited thereto only, examples of the above ring structure are as follows:

[Chemical 1]

Even with a heterocyclic ring represented by the following formula,

[Chemical 2]

there occurs no crosslinking reaction with the polycarboxylic acid polymer to form the amido ester bond if the ring contains no oxygen of ether bond. The crosslinking does not occur, either, if the number of the ring structures is only one. If the number of the ring structures is 3 or more, the structure expands three-dimensionally at the crosslinked point, which is not desirable since there is formed no densely crosslinked structure having excellent gas-barrier property. From the above, it is important that nitrogen and carbon are forming a double bond, carbon is forming an ether bond, an ether bond is formed with carbon that is forming a double bond with nitrogen, that these conditions are not simply existing by themselves but an ether bond is formed with carbon that forms a double bond with carbon, and that there are contained two ring structures having oxygen in the ether bond.

In the compound having two such ring structures, the ring structures may be the same ones or different ones, but it is desired that at least one of them is an oxazoline group or a derivative thereof.

Though not limited thereto only, examples of the compound having two such ring structures include bisoxazolines, such as 2,2'-bis(2-oxazoline), 2,2'-bis(4-methyl-2-oxazoline), 2,2'-bis(5-methyl-2-oxazoline), 2,2'-bis(5,5'-dimethyl-2-oxazoline), 2,2'-bis(4,4,4',4'-tetramethyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-3,3'-diphenoxyethanebis(2-oxazoline), 2,2'-cyclohexylenebis(2-oxazoline), and 2,2'-diphenylenebis(2-oxazoline); and bisoxazines such as 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylenebis(5,6-dihydro-4H-1,3-oxazine) and 2,2'-p.p'-diphenylenebis(5,6-dihydro-4H-1,3-oxazine).

From the standpoint of mechanical properties and colors in the present invention, it is desired that the crosslinked portion formed by the polyacrylic acid polymer and the compound having the above two ring structures, is formed by an aliphatic chain. Among the above compounds, therefore, there can be preferably used those without aromatic ring. Among them, it is particularly desired to use 2,2'-bis(2-oxazoline).

The alicyclic epoxy compound contains an epoxy compound component that has an alicyclic group in the molecules and in which the neighboring carbon atoms of the alicyclic group are forming an oxylane ring. There can be used epoxy compounds having at least one epoxycycloalkyl group, such as epoxycyclohexyl group or epoxycyclopentyl group in the molecules, in a single kind or in combination.

As the alicyclic epoxy compound, there can be exemplified vinylcyclohexene monoepoxide, vinylcyclohexene diepoxide and bis(2,3-epoxycyclopentyl)ether in addition to the alicyclic epoxy compound having two epoxycyclohexyl groups in a molecule.

It is desired that the alicyclic epoxy compound used in the invention is a bifunctional one having two epoxy groups in a molecule.

That is, when the bifunctional alicyclic epoxy compound is used, the crosslinked structure does not so expand three-dimensionally as when a trifunctional or more highly functional alicyclic epoxy compound is used, and there can be formed a densely crosslinked structure having excellent gas-barrier property. Further, the formed film is not so hard or brittle as when the polyfunctional alicyclic epoxy compound is used. Therefore, excellent flexibility is obtained after the retort sterilization, and satisfactory retort resistance is obtained.

As the bifunctional alicyclic epoxy compound, there can be preferably used an alicyclic epoxy compound having at least one alicyclic epoxy group or, more preferably, having at least one epoxycycloalkyl group and, particularly, epoxycyclohexyl group that has an alicyclic group and in which the neighboring carbon atoms of the alicyclic group are forming an oxylane ring and, more preferably, having two such epoxycyclohexyl groups in a molecule.

Though not limited thereto only, examples of the alicyclic epoxy compound (B) having two epoxycyclohexyl groups in a molecule that can be particularly preferably used as the solution (b) include (3,4-epoxy-6-methylcyclohexyl)methyl-3,4-epoxy-6-methyl cyclohexane carboxylate, (3,4-epoxy-6-methylcyclohexyl)methyl-3,4-epoxy-cyclohexane carboxylate, bis(3,4-epoxycyclohexylmethyl)adipate, bis(3,4-epoxycyclohexyl)adipate, bis(3,4-epoxy-6-methylcyclohexylmethyl)adipate, 3,4-epoxy-6-methylcyclohexane carboxylate-3,4-epoxy-6-methylcyclohexane carboxylate, and 3,4-epoxycyclohexylmethyl(3,4-epoxy)cyclohexane carboxylate.

From the standpoint of mechanical properties and colors, the alicyclic epoxy compound is such that the crosslinked portion formed by the polyacrylic acid polymer and the alicyclic epoxy compound, is formed by an aliphatic chain. Among the above alicyclic epoxy compounds, therefore, there can be preferably used those without aromatic ring. Among them, 3,4-epoxycyclohexylmethyl(3,4-epoxy)cyclohexane carboxylate can be particularly preferably used.

As the epoxycyclohexyl group-containing compounds placed in the market, there can be exemplified Cylacure UVR-6100, Cylacure UVR-6105, Cylacure UVR-6110, Cylacure UVR-6128 (which are all manufactured by Dow Chemical Co.), Celoxide 2021, Celoxide 2021P, Celoxide 2081, Celoside 2083, Celoxide 2085, Celoxide 3000, Epolead GT-300, Epolead GT-301, Epolead GT-302, Epolead GT-400, Epolead 401 and Epolead 403 (which are all manufactured by Daicel Kagaku Kogyo Co.), and KRM-2100, KRM-2110 and KRM-2199 (which are all manufactured by Asahi Denka Kogyo Co.).

It is desired that the polycarboxylic acid polymer is contained in the solution (b) in an amount of 2 to 60% by weight and, particularly, 4 to 40% by weight to obtain excellent gas-barrier property.

It is, further, desired that the crosslinking agent is, as required, contained in the solution (b) in an amount of 0.1 to 20 parts by weight per 100 parts by weight of the polycarboxylic acid polymer. If the amount thereof is smaller than the above range, the resistance against the hot water cannot be greatly improved. If the amount thereof exceeds the above range, on the other hand, disadvantage results in economy, the multivalent metal ions fail to form the crosslinked structure with the carboxyl groups to a sufficient degree, and the gas-barrier property cannot be improved.

The solution (b) can be obtained by preparing a solution of the polycarboxylic acid polymer by using a solvent containing at least water and adding the crosslinking agent thereto if it can be dissolved therein, or by adding the crosslinking agent into the solution of the polycarboxylic acid polymer in which the crosslinking agent can be dissolved as a separate solvent composition which is capable of maintaining the state of solution, which is, thereafter, added to the solution of the polycarboxylic acid polymer.

Further, an acidic or basic catalyst may be added to accelerate the reaction of the crosslinking agent with the carboxyl group of the polycarboxylic acid polymer.

As the acid catalyst, there can be exemplified monovalent acids such as acetic acid, propionic acid, ascorbic acid, benzoic acid, hydrochloric acid, paratoluenesulfonic acid and alkylbenzenesulfonic acid, as well as divalent or more highly valent acids such as sulfuric acid, sulfurous acid, phosphoric acid, phosphorous acid, hypophosphorous acid, polyphosphoric acid, pyrophosphoric acid, maleic acid, itaconic acid, fumaric acid and polycarboxylic acid.

As the basic catalyst, there can be exemplified hydroxides of alkali metals or alkaline earth metals, such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylaminodiethanolamine, di-n- or di-isopropanolamine, N-methylethanolamine and N-ethylethanolamine; tertiary monoamines such as dimethylethanolamine, trimethylamine, triethylamine, triisopropylamine, methyldiethanolamine and dimethylaminoethanol; and polyaminetriethylamine such as diethylenetriamine, hydroxyethylaminoethylamine, ethylaminoethylamine and methylaminopropylamine.

The solution (b) may, further, contain an inorganic dispersing material in addition to the above components. Such an inorganic dispersing material has functions for blocking the water component from the exterior and protecting the gas-barrier material, and works to further improve the gas-barrier property and water resistance.

The inorganic dispersing material may have any shape such as spherical shape, needle-like shape or stratified shape, but is the one that can be wetted with the polycarboxylic acid polymer and with the crosslinking agent that is added as required, and that favorably disperses in the solution (b). From the standpoint of blocking the water component, in particular, a silicate compound having a stratified crystal structure is used, such as water-swelling mica or clay. It is desired that the inorganic dispersing material has an aspect ratio of not smaller than 30 but not larger than 5000 from the standpoint of being dispersed in a stratified form and blocking the water component.

It is desired that the content of the inorganic dispersing material is 5 to 100 parts by weight per 100 parts by weight of the sum of the polycarboxylic acid polymer and the crosslinking agent.

(Plastic Base Material)

In the invention, as the plastic base material on which the coating composition (a) is to be applied, there can be exemplified a film, a sheet or any packing material such as a bottle, a cup, a tray or a can made from a heat-moldable thermoplastic resin through such means as extrusion-molding, injection-molding, blow-molding, stretch-blow molding or press-molding.

Preferred examples of the resin that constitutes the plastic base material include olefin copolymers such as low-, intermediate- or high-density polyethylene, linear low-density polyethylene, polypropylene, ethylene/propylene copolymer, ethylene/butene copolymer, ionomer, ethylene/vinyl acetate copolymer and ethylene/vinyl alcohol copolymer; polyesters such as polyethylene terephthalate, polybutylene terephthalate, polyethylene terephthalate/isophthalate and polyethylene naphthalate; polyamides such as nylon 6, nylon 6,6, nylon 6,10 and metaxylene adipamide; styrene copolymers such as polystyrene, styrene/butadiene block copolymer, styrene/acrylonitrile copolymer and styrene/butadiene/acrylonitrile copolymer (ABS resin); vinyl chloride copolymers such as polyvinyl chloride and vinyl chloride/vinyl acetate copolymer; acrylic copolymers such as polymethyl methacrylate and methyl methacrylate/ethyl acrylate copolymer; and polycarbonate.

These thermoplastic resins may be used in a single kind or being blended in two or more kinds together. Further, the plastic base material may be of a single-layer constitution or a laminated constitution of two or more layers formed by, for example, simultaneous melt-extrusion or any other lamination method.

To the above melt-moldable thermoplastic resin, it is allowable to add, as a matter of course and as required, one or two or more kinds of additives such as pigment, antioxidant, antistatic agent, ultraviolet-ray absorber and lubricant in a total amount in a range of 0.001 parts to 5.0 parts per 100 parts by weight of the resin.

To reinforce the container, further, there can be added, for example, a fibrous reinforcing material such as glass fiber, aromatic polyamide fiber, carbon fiber, pulp, or cotton/linter; a powdery reinforcing material such as carbon black or white carbon; or a flaky reinforcing material such as glass flakes or aluminum flakes in one or two or more kinds in a total amount of 2 to 150 parts by weight per 100 parts by weight of the thermoplastic resin. As a filler, further, there can be added heavy or soft calcium carbonate, mica, talc, gypsum, clay, barium sulfate, alumina powder, silica powder or magnesium carbonate in one or two or more kinds in a total amount of 5 to 100 parts by weight per 100 parts by weight of the thermoplastic resin according to a recipe known per se.

In order to improve the gas-barrier property, further, the scale-like inorganic fine powder such as water-wetting mica or clay may be added in a total amount of 5 to 100 parts by weight per 100 parts by weight of the thermoplastic resin according to a recipe known per se.

The plastic base material may be a molded article such as final product film, sheet or container, or the coating may be formed in advance on a pre-formed article from which the container is to be formed. As the pre-formed article, there can be exemplified a cylindrical parison with or without bottom for biaxial stretch-blow molding, a pipe for forming plastic cans, a sheet for vacuum molding, compressed air molding or plug-assisted molding, and a film for heat-sealing lid and bag.

(Producing the Gas-Barrier Laminated Member)

In producing the gas-barrier laminated member of the present invention, the above-mentioned coating composition (a) is applied to at least one surface of the plastic base material.

The amount of applying the coating composition (a) varies depending upon the resin content in the coating composition (a) and the amount of feeding the alkaline compound of the multivalent metal, and cannot be exclusively specified but is, preferably, such that the resin content in the formed layer (A) is in a range of 0.02 to 5.0 g/m$^2$ and, particularly, 0.1 to 2.0 g/m$^2$ and the amount of the multivalent metal ions is not smaller than 0.4 equivalents with respect to the polycarboxylic acid polymer in the solution (b) that is to be applied as described above. If the resin content is smaller than the above range, it becomes difficult to fix the layer (A) to the plastic base material. Even if the resin content exceeds the above range, on the other hand, no particular effect is obtained but a disadvantage in economy.

Further, though dependent upon the kind of the coating material and the amount of application thereof, the coating composition (a) when applied onto the plastic base material is capable of forming the layer (A) upon being dried at a temperature of 40 to 200° C. for 0.5 seconds to 5 minutes and, particularly, at a temperature of 50 to 140° C. for 1 second to 2 minutes. Thus, the layer (A) can be economically formed without affecting the plastic base material.

Next, the solution (b) is applied onto the layer (A) that is formed. The amount of the polycarboxylic acid polymer, i.e., the amount of the free carboxyl groups contained in the resin composition in the solution (b) is, desirably, not smaller than 150 KOH mg/g and, particularly, in a range of 250 to 970 KOH mg/g calculated as an acid value. Here, the acid value is the amount of the potassium hydroxide in milligrams that is necessary for neutralizing the acidic free functional groups contained in a gram of the resin as found by an ordinary method based on the neutralization titration with alkali. The solution (b) is applied desirably in such an amount that the amount of the resin content of before forming the ionic crosslinking in the layer (B) is in a range of 0.3 to 4.5 g/m$^2$ and, particularly, 0.5 to 3.0 g/m$^2$ in a dried state. If the amount of application is smaller than the above range, the barrier property is not obtained to a sufficient degree. Even if the resin content is greater than the above range, on the other hand, no particular effect is obtained but a disadvantage in economy.

Next, the applied solution (b) is heat-treated. In conducting the heat treatment according to the invention, the multivalent metal ions in the layer (A) migrate into the solution (b) to form a crosslinked structure among the carboxyl groups of the polycarboxylic acid polymer. Further, when the solution (b) contains a crosslinking agent, the crosslinking agent also works to form a crosslinked structure due to covalent bond among the carboxyl groups of the polycarboxylic acid polymer.

The solution (b) is desirably heated under the conditions of a temperature of 30 to 140° C. and, particularly, 40 to 120° C. for 0.5 seconds to 2 minutes.

The above coating composition (a) and the solution (b) can be applied and dried or heat-treated according to customary methods.

The method of application may be, though not limited thereto only, for example, spray-coating, dipping, or using a bar coater, a roll coater or a gravure coater.

The drying or the heat treatment can be executed by oven-drying (heating), infrared-ray heating or high-frequency heating.

(Gas-Barrier Laminated Member)

The gas-barrier laminated member produced by the production method of the invention has a two-layer constitution formed on at least one surface of the plastic base material, the lower layer formed on the plastic base material being a coating featuring excellent adhesion to the plastic base material. On the coating, there is formed a gas-barrier layer in which the carboxyl groups of the polycarboxylic acid polymer are ionically crosslinked with multivalent metal ions at a rate of not smaller than 20% and, particularly, not smaller than 40%.

When the gas-barrier layer is blended with the above crosslinking agent, further, a crosslinked structure is formed due to covalent bond among the carboxyl groups of the polycarboxylic acid polymer and, particularly, ester bonds or amido ester bonds are formed, contributing to forming the gas-barrier layer having very excellent resistance against hot water.

The gas-barrier laminated member produced by the production method of the present invention includes the gas-barrier layer which by itself has a sufficient degree of gas-barrier property. Namely, the gas-barrier laminated member has such excellent gas-barrier property and retort resistance as an oxygen permeation amount (in compliance with JIS K-7126) of not larger than 1 cm$^3$/m$^2$·day·atm (in an environment of 25° C.-80% RH) before the retort treatment and an oxygen permeation amount of not larger than 2 cm$^3$/m$^2$·day·atm (in an environment of 25° C.-80% RH) even after the retort treatment. The flexibility was evaluated in terms of the oxygen permeation amount after the retort treatment and after having conducted a crush treatment 100 times by using the Gelboflex tester; i.e., the flexibility was so excellent that the oxygen permeation amount was not larger than 15 cm$^3$/m$^2$·day·atm (in an environment of 25° C.-80% RH).

EXAMPLES

The invention will be further described by way of Examples to which only, however, the invention is in no way limited.
(Oxygen Permeation Amount)

The obtained laminated member of the plastic film was measured for its oxygen permeation amount by using an oxygen permeation amount-measuring apparatus (OX-TRAN 2/20, manufactured by Modern Control Co.). The oxygen permeation amount was also measured after having conducted the retort sterilization treatment at 120° C. for 30 minutes. The measuring conditions consisted of an environmental temperature of 25° C. and a relative humidity of 80%.
(Evaluating the Flexibility)

The obtained laminated member of the plastic film was subjected to the retort sterilization treatment at 120° C. for 30 minutes, cut into a size of 130 mm×100 mm, formed into a cylinder of 30 mmϕ and a length of 130 mm, and was attached to the Gelboflex tester. The crush treatment was effected 100 times by using the Gelboflex tester in an environment of a temperature of 23° C. and a relative humidity of 50% RH. Each crush treatment consisted of a twist motion (twist angle of 180°, length of motion of 60 mm) and a horizontal motion (length of motion of 20 mm). Thereafter, the oxygen permeation amount was measured in a manner as described above.
(Calculating the Ionic Crosslinking Ratio)

The ionic crosslinking ratio is calculated from the measurement of the gas-barrier laminated member after the ionic crosslinking has been formed by using a Fourier-transform infrared spectrophotometer. Upon forming the ionic crosslinking, the carboxylic acid is converted into a carboxylate. It has been known that the carboxylic acid has the characteristic absorption bands, usually, near 920 to 970 cm$^{-1}$, near 1700 to 1710 cm$^{-1}$ and near 2500 to 3200 cm$^{-1}$, and an acid anhydride thereof has the characteristic absorption band near 1770 to 1800 cm$^{-1}$. It has, further, been known that the carboxylate has the characteristic absorption band near 1480 to 1630 cm$^{-1}$. The ionic crosslinking ratio is calculated by using the peak heights in the wavelength region 1600 to 1800 cm$^{-1}$ of the carboxylic acid and the acid anhydride thereof, and by using the peak height in the wavelength region 1480 to 1630 cm$^{-1}$ of the carboxylate. More preferably, use is made of the peak heights in the wavelength regions of 1695 to 1715 cm$^{-1}$ (i) and 1540 to 1610 cm$^{-1}$ (ii). The infrared absorption spectra of the samples are detected, and absorbencies at the wavelengths (i) and (ii) are measured to obtain peak heights. The absorbency coefficients of the carboxylic acid and the carboxylate are regarded to be the same, and a ratio of conversion of the carboxyl groups into the salt (ratio of conversion from the carboxylic acid into the carboxylate), i.e., ionic crosslinking ratio, is calculated from the following formula (1), $$X = \text{peak height of } (ii)/[\text{peak height of } (i) + \text{peak height of } (ii)] \quad (1)$$

The peak heights of (i) and (ii) state differences between the points where the slopes of the peaks overlap the base line and the peaks.
(Measuring Conditions of the Fourier-Transform Infrared Spectroscope)

Device: FTS 7000 Series, manufactured by Digilab Co.
Measuring method: One-time reflection method by using a germanium prism.
Wavelength region for measurement: 4000 to 700 cm$^{-1}$.
(Primary Particle Size of the Alkaline Compound Particles of a Multivalent Metal)

By using an electric field emission-type scanning electron microscope (S-4800, manufactured by Hitachi High Technologies Co.), a secondary electron image of the alkaline compound of the multivalent metal was observed with an acceleration voltage of 5.0 kV and at a magnification of 20,000 times. A hundred particles were measured at random for their particle sizes, and from which a primary particle size was found by arithmetical mean.

Example 1

A polyester polyol (Bailon 200 manufactured by Toyo Boseki Co.) dissolved in an ethyl acetate/MEK mixed solvent (weight ratio of 65/35) was blended with 400% by weight of calcium carbonate (ACE-35, primary particle size: 0.7 μm, manufactured by Calfine Co.) so that the total solid content was 35%, which was, then, milled and dispersed with glass beads (BZ-04 manufactured by Toshinriko Co.) to obtain a paste thereof. The paste was blended with a polyisocyanate (Sumijule N3300, an isocyanulate based on 1,6-hexamethylenediisocyanate, manufactured by Sumika Bayern Urethane Co.) and a di-n-butyltin dilaurate (manufactured by Wako Junyaku Co.) in amounts of 60% by weight and 0.5% by weight with respect to the polyester polyol, and was, further, adjusted with the above mixed solvent so that the total solid content was 30% by weight to thereby obtain a coating solution (a') comprising the coating composition (a) containing the alkaline compound of a multivalent metal.

By using a bar coater, the coating solution (a') was applied onto a biaxially stretched polyethylene terephthalate film of a thickness of 12 μm, and was heat-treated in a box-type electric oven under the conditions of a preset temperature of 70° C. and a treating time of 2 minutes to prepare a polyethylene terephthalate film having a layer 3 corresponding to the layer (A) applied in an amount of 1.6 g/m$^2$.

As the polycarboxylic acid polymer, a polyacrylic acid (AC-10LHP manufactured by Nihon Junyaku Co.) was so dissolved in a water/acetone mixed solvent (weight ratio of 50/50) that the solid content thereof was 6% by weight to obtain a solution (b).

By using the bar coater, the solution (b) was applied onto the layer 3 of the above polyethylene terephthalate film in an amount of 1.8 g/m² to obtain a precursor layer (B). Here, the applied amount of the precursor layer (B) is the amount of the solution (b) directly applied onto the biaxially stretched polyethylene terephthalate film and after it is dried, i.e., the amount of the solution (b) of when only the polyacrylic acid therein is dried without forming ionic crosslinking. The above film after having been applied was heat-treated in a conveyer-type electric oven under the conditions of a preset temperature of 60° C. and a passing time of 15 seconds to obtain a polyethylene terephthalate film having, on the layer 3, a layer 4 forming ionic crosslinking in the precursor layer (B), i.e., to obtain a gas-barrier laminated member.

Figure 1:
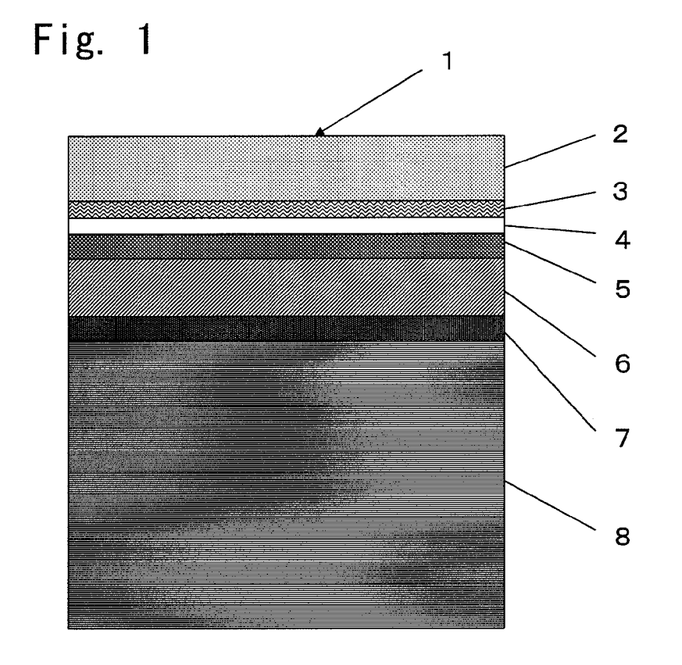
FIG. 1 is a diagram showing a sectional structure of a film laminated member prepared in Example 1.

With the coating of the gas-barrier laminated member as the lower layer, there were successively laminated a layer 5 of an urethane adhesive of a thickness of 2 μm, a biaxially stretched nylon film 6 of a thickness of 15 μm, a layer 7 of an urethane adhesive of a thickness of 2 μm and an unstretched polypropylene film 8 of a thickness of 70 μm to thereby obtain a film laminated member 1 of a layer constitution as shown in FIG. 1.

Example 2

A film laminated member was obtained by the same method as that of Example 1 but using an urethane-modified polyester polyol (UR3210 manufactured by Toyo Boseki Co.) instead of the polyester polyol in the coating solution (a').

Example 3

A film laminated member was obtained by the same method as that of Example 1 but using a calcium hydroxide (manufactured by Wako Junyaku Co.) instead of the calcium carbonate in the coating solution (a') and applying the layer (A) in an amount of 1.2 g/m².

Example 4

A film laminated member was obtained by the same method as that of Example 1 but using a magnesium carbonate (manufactured by Wako Junyaku Co.) instead of the calcium carbonate in the coating solution (a') and applying the layer (A) in an amount of 1.3 g/m².

Example 5

A film laminated member was obtained by the same method as that of Example 1 but using a magnesium hydroxide (manufactured by Wako Junyaku Co.) instead of the calcium carbonate in the coating solution (a') and applying the layer (A) in an amount of 0.9 g/m².

Example 6

A film laminated member was obtained by the same method as that of Example 1 but using a zinc acetate (manufactured by Wako Junyaku Co.) instead of the calcium carbonate in the coating solution (a') and applying the layer (A) in an amount of 2.9 g/m².

Example 7

A film laminated member was obtained by the same method as that of Example 1 but using 100% of water as the solvent of the solution (b), and heat-treating the precursor layer (B) by using the conveyer-type electric oven under the conditions of a preset temperature of 100° C. and a passing time of 20 seconds.

Example 8

A film laminated member was obtained by the same method as that of Example 1 but using a water/acetone mixed solvent (weight ratio of 25/75) as the solvent of the solution (b), and heat-treating the precursor layer (B) by using the conveyer-type electric oven under the conditions of a preset temperature of 60° C. and a passing time of 5 seconds.

Example 9

A film laminated member was obtained by the same method as that of Example 1 but applying the layer (A) in an amount of 1.1 g/m².

Example 10

A film laminated member was obtained by the same method as that of Example 1 but partly neutralizing 10 mol % of the carboxyl groups in the polyacrylic acid in the solution (b) with sodium hydroxide.

Example 11

A film laminated member was obtained by the same method as that of Example 1 but using a water/acetone mixed solvent (weight ratio of 20/80) as the solvent of the solution (b), adding a 3,4-epoxycyclohexylmethyl(3,4-epoxy)cyclohexane carboxylate (Cylacure UVR-6110, manufactured by Dow Chemical Co.) to the solution (b) in an amount of 0.5% by weight with respect to the polyacrylic acid, and heat-treating the precursor layer (B) by using the conveyer-type electric oven under the conditions of a preset temperature of 80° C. and a passing time of 10 seconds.

Example 12

A film laminated member was obtained by the same method as that of Example 1 but using a water/acetone/methanol mixed solvent (weight ratio of 20/10/70) as the solvent of the solution (b), adding a 2,2'-bis(2-oxazoline) (manufactured by Tokyo Kasei Co.) to the solution (b) in an amount of 5% by weight with respect to the polyacrylic acid, and heat-treating the precursor layer (B) by using the conveyer-type electric oven under the conditions of a preset temperature of 100° C. and a passing time of 10 seconds.

Example 13

A film laminated member was obtained by the same method as that of Example 1 but using a calcium carbonate (CS3N-A, primary particle size: 0.3 μm, manufactured by Ube Materials Co.) instead of the calcium carbonate used in Example 1.

Comparative Example 1

A laminated member was obtained by the same method as that of Example 1 but using a magnesium oxide (manufactured by Wako Junyaku Co.) instead of the calcium carbonate in the coating solution (a'), applying the layer (A) in an amount of 0.6 g/m², and heat-treating the precursor layer (B)

by using the conveyer-type electric oven under the conditions of a preset temperature of 120° C. and a passing time of 20 seconds.

Comparative Example 2

A laminated member was obtained by the same method as that of Example 1 but using a methanol/acetone mixed solvent (weight ratio of 50/50) as the solvent of the solution (b).

Comparative Example 3

By using a bar coater, the solution (b) of Example 1 was applied onto a biaxially stretched polyethylene terephthalate film 2 having a thickness of 12 μm, and was heat-treated by using the conveyer-type electric oven under the conditions of a preset temperature of 120° C. and a passing time of 20 seconds to obtain a polyethylene terephthalate film having a layer 10 applied thereon in an amount of 1.8 g/m².

Next, by using the bar coater, the coating solution (a') of Example 1 was applied onto the layer 10 of the above polyethylene terephthalate film having the layer 10, and was heat-treated by using the box-type electric oven under the conditions of a preset temperature of 70° C. and for 2 minutes to obtain a polyethylene terephthalate film having a layer 3 applied onto the layer 10 in an amount of 1.6 g/m².

Figure 2:
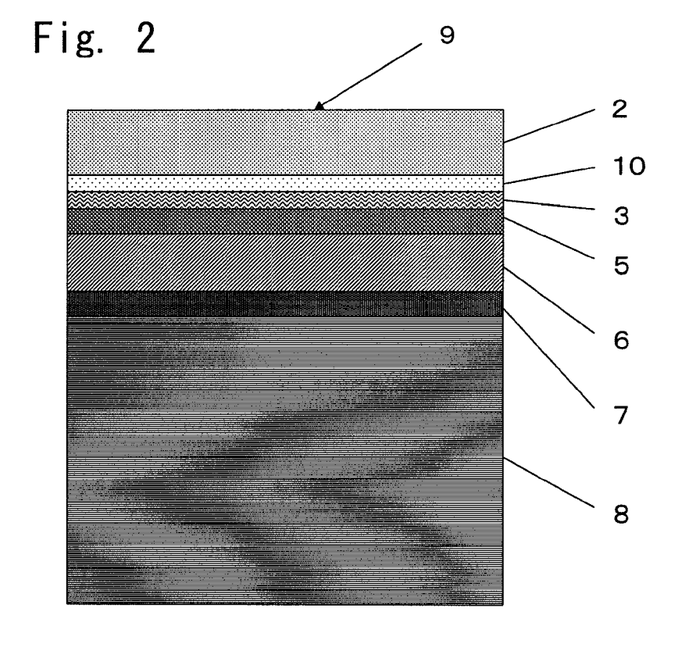
FIG. 2 is a diagram showing a sectional structure of a film laminated member prepared in Comparative Example 3.

With the coating as the lower layer, there were successively laminated a layer 5 of an urethane adhesive of a thickness of 2 μm, a biaxially stretched nylon film 6 of a thickness of 15 μm, a layer 7 of an urethane adhesive of a thickness of 2 μm and an unstretched polypropylene film 8 of a thickness of 70 μm to thereby obtain a laminated member 9 of a layer constitution as shown in FIG. 2.

Comparative Example 4

Instead of using the coating solution (a') of Example 1, a coating solution (a') was used as obtained by the same method as that of Example 1 but using an emulsion-type aqueous polyurethane resin (Superflex 500 manufactured by Daiichi Kogyo Seiyaku Co.) as the polyester polyol in the coating solution (a'), using a water-soluble polycarbodiimide (Carbodilite SV-02 manufactured by Nisshinbo Co.) as the polyisocyanate, and adding no di-n-butyltin dilaurate. Thereafter, a laminated member was obtained in the same manner as that of Comparative Example 3 but heat-treating the above coating solution (a') that was applied by using the box-type electric oven under the conditions of a preset temperature of 140° C. for 2 minutes.

Table 1 shows the contents of Examples and Comparative Examples.

TABLE 1

| | | | Layer (A) containing alkaline compound of multivalent metal | | | |
| --- | --- | --- | --- | --- | --- | --- |
| | | | Alkaline compound of multivalent metal | | | Multivalent |
| | Main agent | Curing agent | Compound species | Blended amount (wt % per the whole resins) | Amount applied (g/m²) | metal equivalent (eq) |
| Ex. 1 | polyester polyol | polyisocyanate | calcium carbonate | 250 | 1.6 | 0.9 |
| Ex. 2 | urethane-modified polyester polyol | polyisocyanate | calcium carbonate | 250 | 1.6 | 0.9 |
| Ex. 3 | polyester polyol | polyisocyanate | calcium hydroxide | 250 | 1.2 | 0.9 |
| Ex. 4 | polyester polyol | polyisocyanate | magnesium carbonate | 250 | 1.3 | 0.9 |
| Ex. 5 | polyester polyol | polyisocyanate | magnesium hydroxide | 250 | 0.9 | 0.9 |
| Ex. 6 | polyester polyol | polyisocyanate | zinc acetate | 250 | 2.9 | 0.9 |
| Ex. 7 | polyester polyol | polyisocyanate | calcium carbonate | 250 | 1.6 | 0.9 |
| Ex. 8 | polyester polyol | polyisocyanate | calcium carbonate | 250 | 1.6 | 0.9 |
| Ex. 9 | polyester polyol | polyisocyanate | calcium carbonate | 250 | 1.1 | 0.6 |
| Ex. 10 | polyester polyol | polyisocyanate | calcium carbonate | 250 | 1.6 | 0.9 |

| | | | Precursor layer (B) | | | |
| --- | --- | --- | --- | --- | --- | --- |
| | Polyacrylic acid partly neutralized | Crosslinking agent (blended amount) | Solvent composition (weight ratio) | Amount applied (g/m²) | Oven condition (conveyer type) | Remarks |
| Ex. 1 | no | no | water/acetone = 50/50 | 1.8 | 60° C. - 15 sec | |
| Ex. 2 | no | no | water/acetone = 50/50 | 1.8 | 60° C. - 15 sec | |
| Ex. 3 | no | no | water/acetone = 50/50 | 1.8 | 60° C. - 15 sec | |
| Ex. 4 | no | no | water/acetone = 50/50 | 1.8 | 60° C. - 15 sec | |
| Ex. 5 | no | no | water/acetone = 50/50 | 1.8 | 60° C. - 15 sec | |
| Ex. 6 | no | no | water/acetone = 50/50 | 1.8 | 60° C. - 15 sec | |
| Ex. 7 | no | no | water/acetone = 100/0 | 1.8 | 100° C. - 20 sec | |
| Ex. 8 | no | no | water/acetone = 25/75 | 1.8 | 60° C. - 5 sec | |
| Ex. 9 | no | no | water/acetone = 50/50 | 1.8 | 60° C. - 15 sec | |
| Ex. 10 | yes | no | water/acetone = 50/50 | 1.8 | 60° C. - 15 sec | |

| | | | Layer (A) containing alkaline compound of multivalent metal | | | |
| --- | --- | --- | --- | --- | --- | --- |
| | | | Alkaline compound of multivalent metal | | | Multivalent |
| | Main agent | Curing agent | Compound species | Blended amount (wt % per the whole resins) | Amount applied (g/m²) | metal equivalent (eq) |
| Ex. 11 | polyester polyol | polyisocyanate | calcium carbonate | 250 | 1.6 | 0.9 |
| Ex. 12 | polyester polyol | polyisocyanate | calcium carbonate | 250 | 1.6 | 0.9 |

TABLE 1-continued

| | | | | | | |
|---|---|---|---|---|---|---|
| Ex. 13 | polyester polyol | polyisocyanate | calcium carbonate (0.3 μm) | 250 | 1.6 | 0.9 |
| Comp. Ex. 1 | polyester polyol | polyisocyanate | magnesium oxide | 250 | 0.6 | 0.9 |
| Comp. Ex. 2 | polyester polyol | polyisocyanate | calcium carbonate | 250 | 1.6 | 0.9 |
| Comp. Ex. 3 | polyester polyol | polyisocyanate | calcium carbonate | 250 | 1.6 | 0.9 |
| Comp. Ex. 4 | aqueous polyurethane resin | water-soluble polycarbodiimide | calcium carbonate | 250 | 1.6 | 0.9 |

| | Precursor layer (B) | | | | | |
|---|---|---|---|---|---|---|
| | Polyacrylic acid partly neutralized | Crosslinking agent (blended amount) | Solvent composition (weight ratio) | Amount applied (g/m$^2$) | Oven condition (conveyer type) | Remarks |
| Ex. 11 | no | (1) | water/acetone = 20/80 | 1.8 | 80° C. - 10 sec | |
| Ex. 12 | no | (2) | water/acetone/methanol = 20/10/70 | 1.8 | 100° C. - 10 sec | |
| Ex. 13 | no | no | water/acetone = 50/50 | 1.8 | 60° C. - 15 sec | |
| Comp. Ex. 1 | no | no | water/acetone = 50/50 | 1.8 | 120° C. - 20 sec | (3) |
| Comp. Ex. 2 | no | no | methanol/acetone = 50/50 | 1.8 | 60° C. - 15 sec | (4) |
| Comp. Ex. 3 | no | no | water/acetone = 50/50 | 1.8 | 120° C. - 20 sec | (5) |
| Comp. Ex. 4 | no | no | water/acetone = 50/50 | 1.8 | 120° C. - 20 sec | (6) |

(1) 3,4-epoxycyclohexylmethyl(3,4-epoxy)cyclohexane carboxylate, 0.5 wt %
(2) 2,2'-bis(2-oxazoline), 5 wt %
(3) neutralized compound of multivalent metal
(4) solution (b) contains no water
(5) layer (A) is upper layer, layer (B) is lower layer
(6) layer (A) is aqueous and upper layer, heat-treated at 140° C. for 2 min (box type), layer (B) is lower layer Table 2 shows the measured results of ionic crosslinking ratios of the obtained gas-barrier laminated members, oxygen permeation amounts of the obtained laminated members of before and after the retort treatment, and oxygen permeation amounts of after the retort treatment and after the crush treatment effected 100 times by using the Gerboflex tester.

Examples 1 to 13 all exhibited favorable barrier properties both before and after the retort treatment, and were evaluated to possess favorable flexibilities even after the crush treatment.

INDUSTRIAL APPLICABILITY

According to the method of producing the gas-barrier laminated member of the present invention, there is no need of conducting the dipping treatment or the spray treatment that was necessary for forming the gas-barrier material by crosslinking the carboxyl groups of the polycarboxylic acid polymer with multivalent metal ions, making it possible to decrease the number of the steps, to easily form the crosslinked structure by only the heating at a low temperature for a shortened period of time. Therefore, the gas-barrier

TABLE 2

| | | Oxygen permeation amount (cm$^3$/m$^2$ · day · atm) (1) | | | |
|---|---|---|---|---|---|
| | Ionic crosslinking ratio (%) | Before retort treatment | After retort treatment | After retort treatment and after 100 times of crush treatment | Remarks |
| Ex. 1 | 72 | <0.05 | 0.10 | 4.4 | |
| Ex. 2 | 83 | <0.05 | 0.08 | 4.0 | |
| Ex. 3 | 78 | <0.05 | 0.15 | 5.8 | |
| Ex. 4 | 75 | <0.05 | 0.14 | 6.3 | |
| Ex. 5 | 88 | <0.05 | 0.19 | 7.1 | |
| Ex. 6 | 52 | 0.09 | 0.75 | 7.5 | |
| Ex. 7 | 76 | <0.05 | 0.57 | 10.2 | |
| Ex. 8 | 65 | <0.05 | 0.11 | 3.6 | |
| Ex. 9 | 59 | <0.05 | 1.4 | 8.1 | |
| Ex. 10 | 74 (2) | <0.05 | 0.2 | 5.4 | |
| Ex. 11 | 61 | <0.05 | 0.11 | 5.8 | |
| Ex. 12 | 62 | <0.05 | 0.34 | 9.2 | |
| Ex. 13 | 77 | <0.05 | <0.05 | 2.8 | |
| Comp. Ex. 1 | <5 | 110 | — | — | (4) |
| Comp. Ex. 2 | <5 | 110 | 37 | 85 | |
| Comp. Ex. 3 | <5 (3) | 110 | — | — | (4) |
| Comp. Ex. 4 | 8 (3) | 98 | 74 | — | (5) |
| (Reference) Laminated member without coating | — | 70 | 130 | 130 | |

(1) Oxygen permeation amount: Favorable if not larger than 1 cm$^3$/m$^2$ · day · atom before the retort treatment, not larger than 2 cm$^3$/m$^2$ · day · atom after the retort treatment and not larger than 15 cm$^3$/m$^2$ · day · atom after the crush treatment.
(2) Ionic crosslinking ratio: Calculated by subtracting the amount of partial neutralization.
(3) Ionic crosslinking ratio: A diamond prism was used for the measurement with the Fourier-transform infrared spectrophotometer.
(4) delaminated due to dissolution of coating during retort treatment
(5) delaminated during crush treatment material is produced maintaining good productivity without adversely affecting the plastic base material and requiring a shortened period of production time and a decreased amount of energy.

Further, the gas-barrier laminated member obtained by the production method of the present invention features excellent gas-barrier property, water resistance and flexibility, maintains excellent gas-barrier property even after subjected to high temperatures and wet heated conditions such as of retort sterilization and, therefore, exhibits excellent retort resistance, too.

DESCRIPTION OF REFERENCE NUMERALS

1, 9: laminated members
2: biaxially stretched polyethylene terephthalate film having a thickness of 12 μm
3: layer (A) containing an alkaline compound of a multivalent metal
4, 10: layers forming metal-ionic crosslinking among the carboxyl groups of the polycarboxylic acid polymer in the precursor layer (B)
5, 7: layers of an urethane adhesive of a thickness of 2 μm
6: biaxially stretched nylon film of a thickness of 15 μm
8: unstretched polypropylene film of a thickness of 70 μm

The invention claimed is:

1. A method of producing a gas-barrier laminated member comprising
forming, on at least one surface of a plastic base material,
a layer (A) comprising a coating composition (a) that contains
an alkaline compound of a multivalent metal,
an isocyanate compound and
a resin component in an amount of 15 to 80% by weight with respect to the solid component, the resin component containing a polyester polyol having a resin skeleton with no monovalent metal element;
and thereafter,
applying onto the layer (A) a solution (b) obtained by dissolving a polycarboxylic acid polymer in a solvent containing at least water and containing a crosslinking agent capable of forming a crosslinked structure due to covalent bonds between carboxyl groups unreacted with the multivalent metal ion, and removing the solvent by a heat treatment so that a metal-ionically crosslinked structure due to the multivalent metal ions and a crosslinked structure due to the covalent bonds are formed among the carboxyl groups in the solution (b).

2. The method of producing a gas-barrier laminated member according to claim 1, wherein a urethane bond is formed in said layer (A).

3. The method of producing a gas-barrier laminated member according to claim 1, wherein said solution (b) contains a solvent having good affinity to the layer that contains the alkaline compound of the multivalent metal.

4. The method of producing a gas-barrier laminated member according to claim 1, wherein said polycarboxylic acid polymer is a poly(meth)acrylic acid or a partly neutralized product thereof.

5. The method of producing a gas-barrier laminated member according to claim 1, wherein the primary particle size of the alkaline compound of the multivalent metal is not larger than 0.5 μm.

6. The method of producing a gas-barrier laminated member according to claim 1, wherein said alkaline compound of the multivalent metal comprises at least one of a carbonate or a hydroxide of calcium or magnesium.

7. The method of producing a gas-barrier laminated member according to claim 1, wherein said cross-linked portion is forming at least two ester bonds or amido ester bonds.

8. The method of producing a gas-barrier laminated member according to claim 1, wherein said cross-linked portion is forming at least one ester bond neighboring the cycloalkyl group.

9. The gas-barrier laminated member produced by the production method of claim 1.

\* \* \* \* \*